(12) United States Patent
Chiu et al.

(10) Patent No.: US 8,255,415 B2
(45) Date of Patent: Aug. 28, 2012

(54) EMBEDDED SEARCHING SYSTEM AND THE METHOD THEREOF

(75) Inventors: Chaucer Chiu, Taipei (TW); Cui Wu, Shanghai (CN)

(73) Assignee: Inventec Corporation, Taipei (TW)

( * ) Notice: Subject to any disclaimer, the term of this patent is extended or adjusted under 35 U.S.C. 154(b) by 240 days.

(21) Appl. No.: 12/662,754

(22) Filed: May 3, 2010

(65) Prior Publication Data
US 2011/0252048 A1    Oct. 13, 2011

(30) Foreign Application Priority Data

Apr. 8, 2010  (TW) ................................ 99110848 A (51) Int. Cl.
*G06F 17/30* (2006.01)
(52) U.S. Cl. ........................................ 707/769; 707/804
(58) Field of Classification Search .................. 707/769, 707/804
See application file for complete search history.

(56) References Cited

U.S. PATENT DOCUMENTS

| | | | | |
|---|---|---|---|---|
| 5,758,154 | A * | 5/1998 | Qureshi ............................. | 713/1 |
| 7,346,613 | B2 * | 3/2008 | Hurst-Hiller et al. ......... | 707/711 |
| 7,565,517 | B1 * | 7/2009 | Arbon ............................... | 713/1 |
| 7,831,581 | B1 * | 11/2010 | Emigh et al. .................. | 707/706 |
| 7,917,605 | B1 * | 3/2011 | McQuarrie .................... | 709/221 |
| 2003/0212736 | A1 * | 11/2003 | Kotnur et al. ................. | 709/202 |
| 2004/0143564 | A1 * | 7/2004 | Gross et al. ....................... | 707/1 |
| 2005/0050084 | A1 * | 3/2005 | Atm ............................... | 707/102 |
| 2005/0262163 | A1 * | 11/2005 | Seki et al. ..................... | 707/203 |
| 2008/0319943 | A1 * | 12/2008 | Fischer ............................ | 707/3 |
| 2009/0265482 | A1 * | 10/2009 | Abe et al. .......................... | 710/8 |
| 2010/0100839 | A1 * | 4/2010 | Tseng et al. .................. | 715/780 |
| 2010/0235338 | A1 * | 9/2010 | Gabriel ........................ | 707/706 |
| 2010/0250433 | A1 * | 9/2010 | Shivers et al. ................. | 705/39 |
| 2010/0332325 | A1 * | 12/2010 | Holte ......................... | 705/14.54 |
| 2011/0078569 | A1 * | 3/2011 | Lorch et al. .................... | 715/708 |

OTHER PUBLICATIONS

Easy Desk Software, The Window Registry Files and Where to Find Them, Copyright 2011, 4 pages, accessed online at <http://www.easydesksoftware.com/regfiles.htm> on Feb. 24, 2012.*

Jayesh Blog, "How can I embed "Google Search" box in my website?", Jun. 27, 2008, 4 pages, accessed online at <http://blog.jayesh.com.np/2008/06/how-can-i-embed-google-search-box-in-my-website/> on Jun. 12, 2012.*

TeachingBooks.net, "Embed a Search box on Your Website", 2012, 2 pages, accessed online at <http://www.teachingbooks.net/support.cgi?f=support_embed_search_box> on Jun. 12, 2012.*

* cited by examiner

*Primary Examiner* — Phuong Thao Cao
(74) *Attorney, Agent, or Firm* — Bacon & Thomas, PLLC (57) ABSTRACT

An embedded searching system uses an application name to search for the interface specifications for the application. The interface specifications are used to update default registry information of the operating system. Different applications can thus be embedded with a search field. This increases the convenience of searching for the applications. The mechanism also produces a corresponding method.

5 Claims, 9 Drawing Sheets

EMBEDDED SEARCHING SYSTEM AND THE METHOD THEREOF

BACKGROUND OF THE INVENTION

1. Field of Invention

The invention relates to a searching system and the method thereof. In particular, the invention relates to an embedded searching system that embeds default registry information of the operating system into a search field of an application.

2. Related Art

In recent years, various kinds of applications are available on computer operating systems (OS), thanks to the rapid development in information technology.

Figure 3:
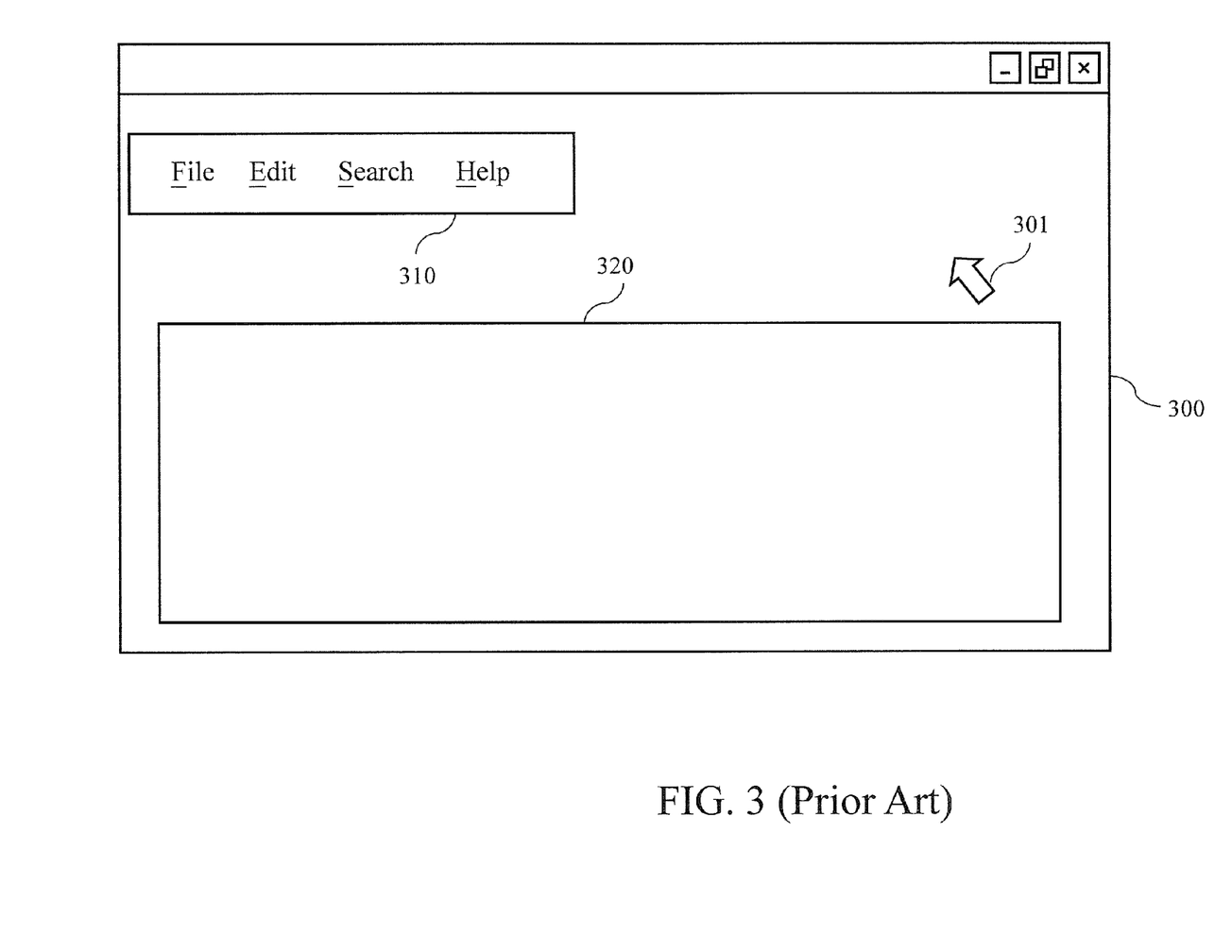
FIG. 3 is a schematic view of a conventional application operating interface.

The operating interface of a conventional application is shown in FIG. 3. Its toolbar 310 has the function of searching (or find). Its user can click this function via a cursor 301 and enter text for searching. Afterwards, the searching content is used to search whether the input text exists in the display field 320 of the application. The search result is then given to the user. For example, suppose the application is a word editing utility (e.g., the Microsoft Word). The user can use its searching function (e.g., find) to search for identical text in the currently edited document.

However, the searching functions of different applications may not be exactly the same. Therefore, the user has to learn and get used to these different searching functions. This is very time-consuming. Also, the quality of these searching functions varies a lot. It is very inconvenient. Consequently, how to integrate the searching functions of different applications has become an important issue for all vendors. For example, one may want to abandon the searching functions provided by individual applications and to find an independent searching program that is compatible with all applications to reduce the learning time of the user.

In summary, the prior art always has the problem of integrating the searching functions of different applications. It is therefore highly desirable to provide a better solution.

SUMMARY OF THE INVENTION

In view of the foregoing, this interface specification discloses an embedded searching system and the method thereof.

According to the disclosed embedded searching system, the default registry information of an application in the OS records a registry code of the application. The disclosed system includes: an application database, a registry table searching module, an updating module, an embedding module, a receiving module, and a searching module. The application database stores the application names and the corresponding interface specifications. The registry table searching module searches for applications in the registry information according to their names. The updating module searches in the application database and loads the interface specifications for the application in order to update the registry information. When one of the applications is executing, the embedding module follows the operating interface of the application and its registry information to generate a search field to be embedded into the operating interface of the application. The receiving module receives search content and search criterion after the search field is clicked. The searching module uses the search criterion to compare the search content with the contents of a document, web page, or the resource file of an application. When there is a match, it produces a feedback.

As described above, the search criterion includes search types of web page, document, directory and hotkey. When the search criterion is the search type of web page, it further provides a search level in order to define the search and extraction range. After the search field is clicked, a search window is prompted for the user to enter search content and search criterion. The search window shows the search result. The resource file includes non-executable text strings.

According to the embedded searching method of the invention, the default registry information of the OS is used in an application. The registry information records the registry code of the application. The method includes the steps of: storing the name of each application and its corresponding interface specification in an application database; finding in the registry information the application according to the application name; searching in the application database and loading the interface specifications compliant with the application in order to update the registry information; when executing one of the applications, using the operating interface of the executing application and its registry information to generate a search field to be embedded into the operating interface of the application; receiving search content and search criterion after the search field is clicked; and comparing the search content with the contents of a document, web page, or resource file of the application according to the search criterion, and producing a feedback when there is a match.

Moreover, the above-mentioned method further provides the step of setting a search level in order to define the search and extraction range when the search criterion is the search type of web page. After the search field is clicked, the method also includes the step of generating a search window for the input of search content and search criterion and showing the search result in the search window.

As described above, the invention differs from the prior art in that the invention uses the application name to search for the interface specifications for the application. It then uses the interface specifications to update the default registry information in the OS. Different applications can be appended with a search field by embedding.

The above-mentioned technique of the invention can facilitate searches in applications.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Before explaining the embedded searching system and method of the invention, we first describe their application environment. The invention is used in the applications of an operating system (OS) through the default registry information of the OS. The registry information records the registry codes of all the applications. For example, the code position is '[HKEY_LOCAL_MACHINE\ . . . ]', the code name is '{92B . . . }', the type is 'REG_SZ', the parameter value is 'IEBar', etc. In practice, the user can modify the registry code of each application to control the executing method and functions thereof. Since the default registry information and the modification method in the OS belong to the prior art, they are not described herein.

Figure 1:
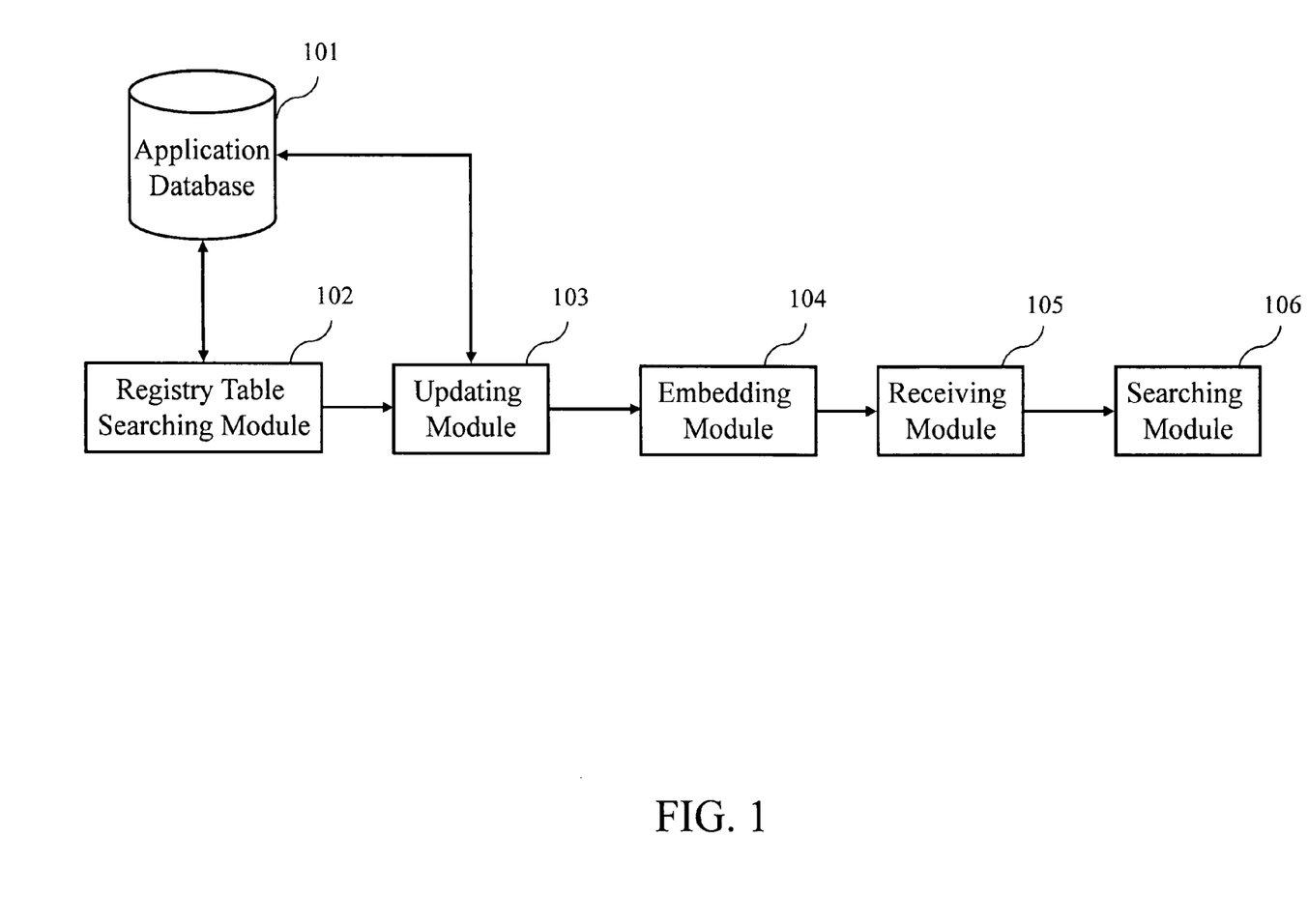
FIG. 1 is a system block diagram of the embedded searching system according to the invention.

First, please refer to FIG. 1, which is a system block diagram of the embedded searching system according to the invention. The embedded searching system includes: an application database 101, a registry table searching module 102, an updating module 103, an embedding module 104, a receiving module 105, and a searching module 106. The application database 101 stores the name of applications along with the corresponding interface specifications. For example, suppose the application is 'translation.exe'. Then the application name and the corresponding interface specification are 'translation' and 'translation.reg', respectively. In particular, 'translation.reg' is a file of registry files for modifying the registry information in the OS. The modifications can be done in batch. It should be emphasized that in practice the application database 101 can be a relational database system and contains the names of various possible applications (e.g., common software programs on the market) along with their interface specifications. Since the settings and format of the file of registry files belongs to the prior art, it is not further described herein.

The registry table searching module 102 searches for the applications in the registry information for the names stored in the application database 101. For example, suppose the application database 101 stores the name 'translation' corresponding to the application 'translation.exe' and its interface specification 'translation.reg'. Then the registry table searching module 102 searches whether there is any string same as the application name 'translation' in the default registry information of the OS. If it is found, then it means that the OS is installed with the application. Otherwise, the OS is not installed with the application.

The updating module 103 searches in the application database 101 for the interface specification for the application and loads it for updating the registry information. For example, suppose the registry table searching module 102 finds an application. The updating module 103 searches and loads the corresponding interface specification in the application database 101 for updating the registry information. In practice, the loaded interface specification can be a file of registry files (e.g., one with the auxiliary filename of 'reg'), such as 'translation.reg'. Besides, the interface specification can be a communication protocol between different applications so that they can communicate with each other, such as transmitting parameters.

When one of the applications is executing, the embedding module 104 uses the operating interface of the executing application and its registry information to generate a search field to be embedded into the operating interface thereof. For example, suppose the operating interface of the executing application has a toolbar with the functions of File, Edit, View, etc. The embedding module 104 uses the operating interface of the executing application and its registry information to generate a search field to be embedded into the operating interface thereof. In practice, the search field can include the element for the user to enter search content and search criterion (e.g., using clicking elements or pull-down menus).

After the search field is clicked, the receiving module 105 receives the search content and the search criterion. For example, after the user uses the cursor to click the search field, the receiving module 105 receives the search content and the search criterion. The search criterion includes the search type of web page, document, directory, and hotkey.

The searching module 106 compares the search content according to the search criterion with the content of a document, web page, or the resource file of an application. It produces a feedback when there is a match. The resource file includes non-executable text strings (e.g., hotkey text). For example, suppose the search criterion is the search type of web page and the search content is 'test'. The searching module 106 compares the search content 'test' with all words in the web page, and prompts the user when there is a match. Moreover, it can provide the setting of search levels in order to define the search and extraction range. For example, suppose the search level is set as '3'. This means that the searching module 106 will search the linked web pages (e.g., the second level) of the hyperlinks in the web page (e.g., the first level). It further searches the web pages in the third level following the hyperlinks in the second level.

Figure 2:
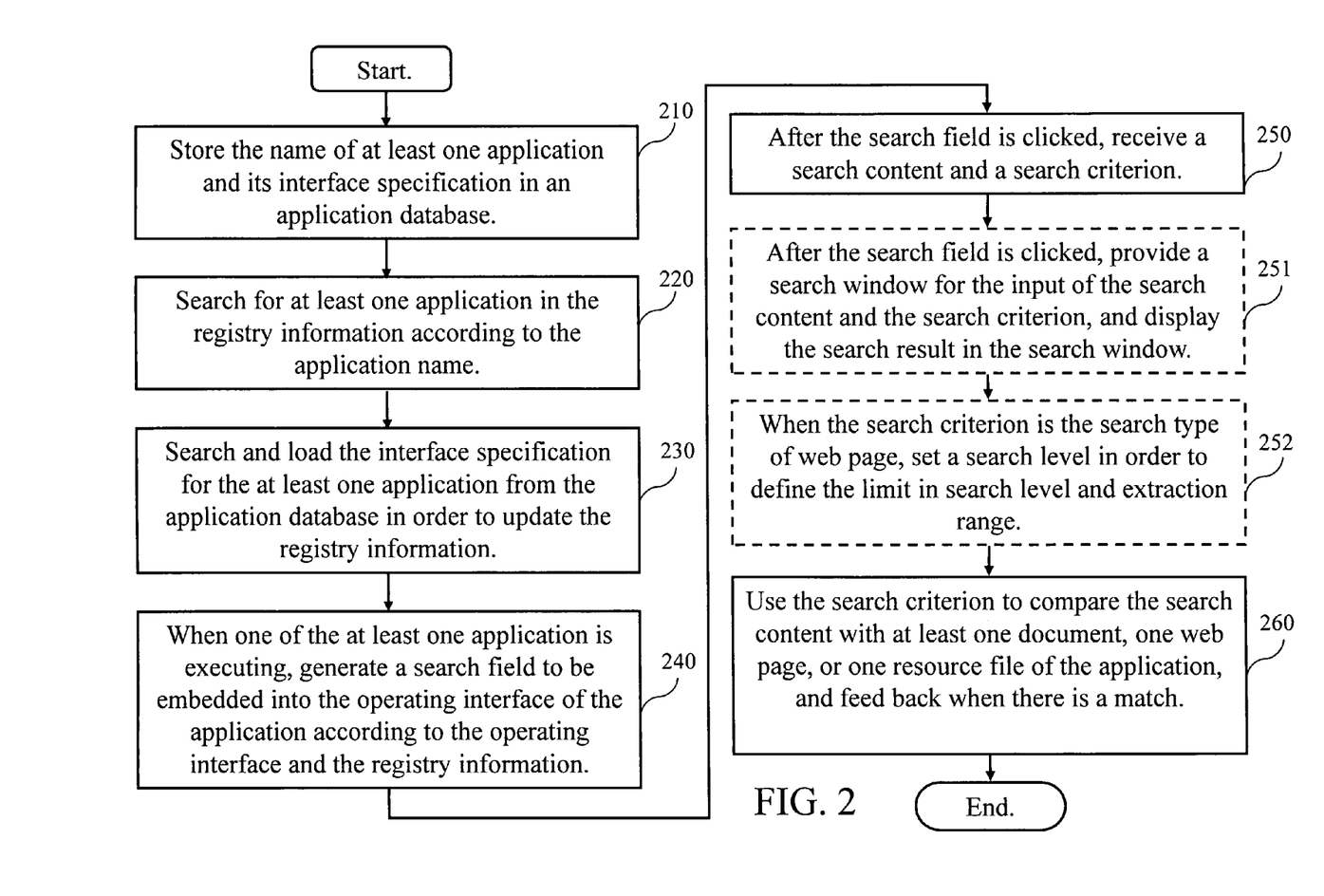
FIG. 2 is a flowchart of the embedded searching method according to the invention.

FIG. 2 is a flowchart of the embedded searching method according to the invention. It includes the following steps. In step 210, the application database stores the names of all the applications on the OS and the corresponding interface specifications. Step 220 finds in the registry information the application according to the application name. Step 230 searches in the application database and loads the interface specifications compliant with the application in order to update the registry information. When one of the applications is executing, step 240 uses the operating interface of the executing application and its registry information to generate a search field to be embedded into the operating interface of the application. Step 250 receives search content and search criterion after the search field is clicked. Step 260 compares the search content with the contents of a document, web page, or resource file of the application according to the search criterion, and produces a feedback when there is a match. Through the above steps, the invention uses the application name to search for the interface specification for the application. The interface specification is then used to update the default registry information in the OS. Therefore, different applications can be appended with a search field in an embedding way.

After step 250, the invention can further include the step of generating a search window for the user to enter search content and search criterion, and displaying the search result therein (step 251). In addition, when the search criterion is the search type of web page, the invention further allows the setting of search level for defining the limit of search level and extraction range (step 252). Since the technique of searching web pages of different levels belongs the prior art, it is not further discussed herein.

Figure 4:
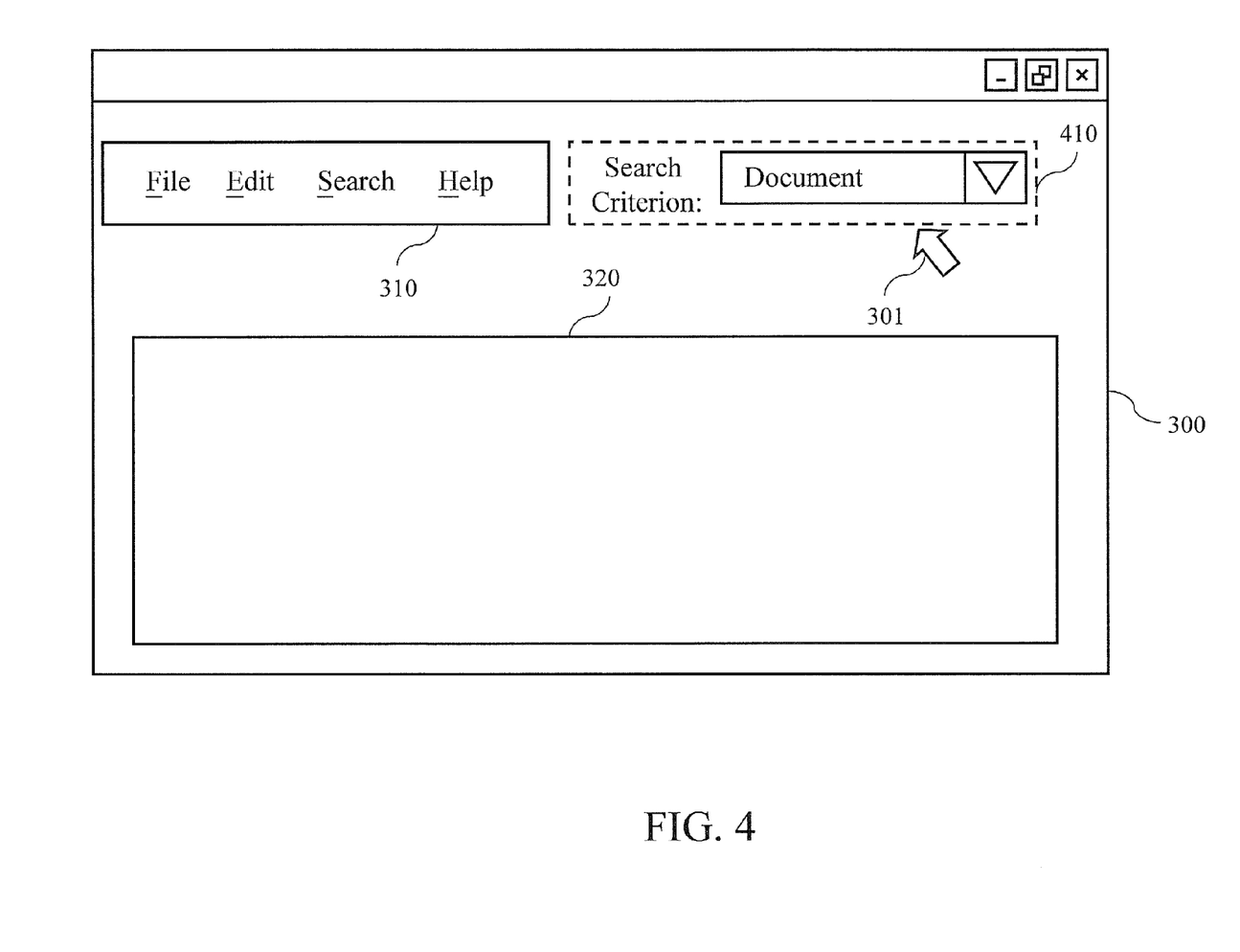
FIG. 4 is a schematic view of the embedded search field according to the invention.
Figure 8A:
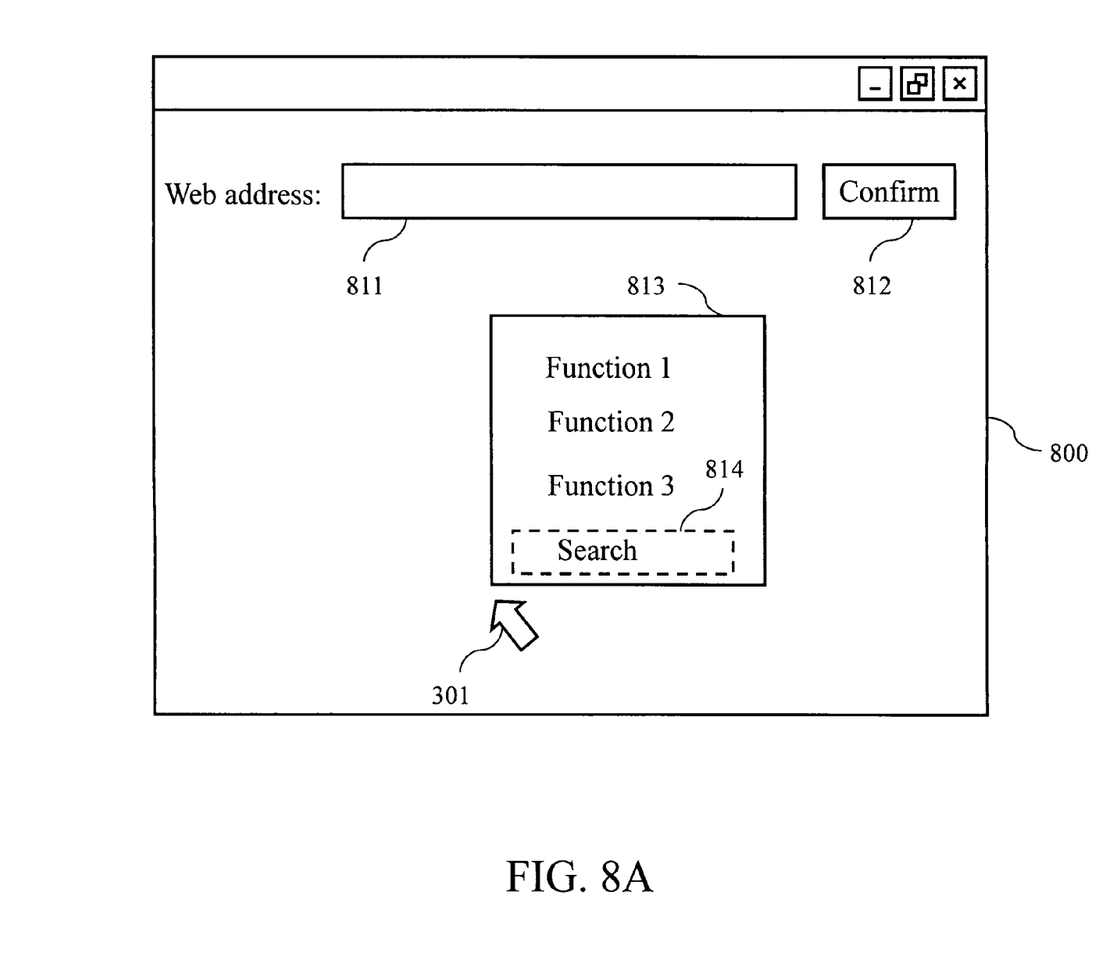
FIGS. 8A and 8B are schematic views of the search window in the fourth embodiment.
Figure 8B:
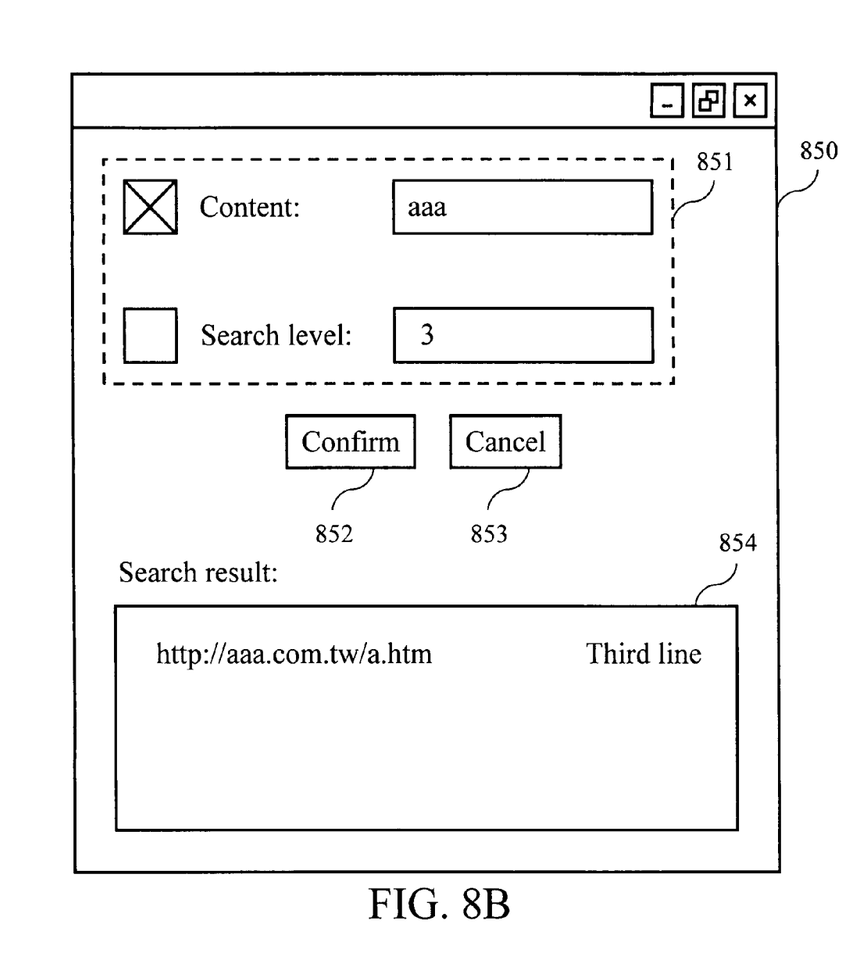

FIGS. 4 and 8 illustrate an embodiment of the invention. Please first refer to FIG. 4, which is a schematic view of embedding a search field according to the invention. It includes: an application operating interface 300, a cursor 301, a toolbar 310, an editing field 320, and a search field 410. It should be noted that the invention does not restrict the size, position, and type of the search field 410.

Before a user uses the invention for his search, the registry table searching module 102 searches in the registry information for an appropriate application according to the names stored in the application database 101. After the appropriate application is found, the corresponding interface specification is searched and loaded from the application database 101 in order to update its registry information. For example, suppose the user wants to use the invention on a word processing application 'word.exe' (the application). The application database 101 stores the name 'word' and the interface specification 'word.reg' of this application.

Afterwards, the registry table searching module 102 uses the application name 'word' to search in the registry information whether any application has this name (i.e., 'word.exe'). If it is found, then the updating module 103 searches in the application database 101 for the interface specification for the application and updates its registry information. If not, then it is not necessary to load the interface specification of the application 'word.exe' and update its registry information. In the above example, the default registry information of the OS records the name 'word' of the application 'word.exe'. Therefore, the updating module 103 searches and loads the corresponding interface specification (e.g., 'word.reg') in the application database 101. The registry information is then updated according to the interface specification, such as adding/deleting the code name, parameters, and so on in the registry information.

When the user runs the application, the application executes the corresponding application operating interface 300 and the registry information, and allows the user to operate the toolbar 310 and the editing field 320 in the application operating interface 300. Therefore, the embedding module 104 uses the application operating interface 300 and its registry information to generate a search field 410 to be embedded into the application operating interface 300, as shown in FIG. 4. It should be emphasized that the invention does not restrict the way of presenting the search field 410. In practice, clicking elements or pull-down menus are be used for the user to enter a search content and set a search criterion.

As described above, after the search field 410 is clicked by the cursor 301, the receiving module 105 uses the search content and search criterion in the clicked search field 410 and receives them. For example, the search field 410 can include a first clicking element and a second clicking element (not shown). The selection done by the user on the first clicking element is used as the search content, and the selection on the second clicking element is used as the search criterion. They are received by the receiving module 105. Furthermore, after the search field 410 is clicked, the invention provides a search window for the user to enter the search content and search criterion. The search result is also displayed in the search window.

Figure 5:
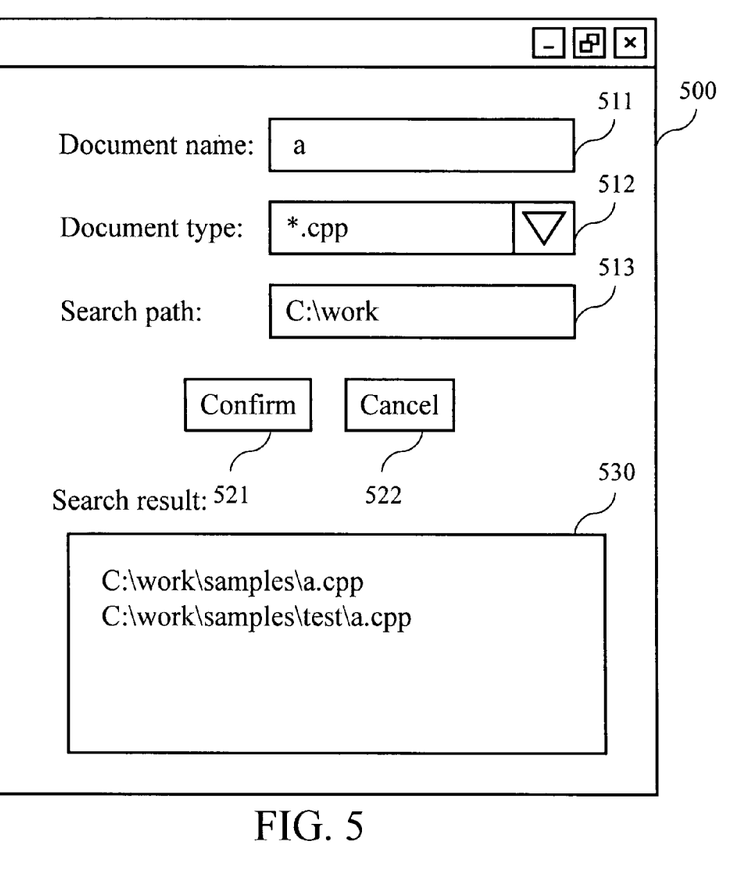
FIG. 5 is a schematic view of the search window in the first embodiment.

Please refer to FIG. 5, which is a schematic view of the search window according to the first embodiment. As mentioned before, the search window 500 is provided after the search field 410 is clicked. In practice, the search window 500 includes: an input field 511, a selecting element 512, a path input field 513, a confirming element 521, a canceling element 522, and a display field 530. It should be mentioned that the invention does not restrict the type and number of elements in the search window 500.

As described above, the user can use advanced search functions via the search window 500. For example, the user can enter the search content (e.g., 'a') in the input field 511, and designate the document type using the selecting element (e.g., all the files with the auxiliary filename 'cpp'), and specify the search path in the path input field 513 (e.g., 'C:\work'). This restricts the search range and increases the search efficiency. After the user finishes his input, he can click the confirming element 521 to start the search, or click the canceling element 522 to cancel the search. After the search is over, the result is shown in the display field 530. That is, in the first embodiment, the search field 410 is a pull-down menu. After 'document' is clicked, it immediately generates a search window 500. In this case, the receiving module 105 sets the search criterion as a document, and uses the input text by the user in the search window 500 as the search content (including document name, document type, and search path, etc). Afterwards, the searching module 106 uses the search content and the search criterion received by the receiving module 105 to compare the search content with the document (e.g., with the document name). When there is a match, the result is shown in the display field 530. As shown in the display field 530 in FIG. 5, the search result is in the search path 'C:\work' and has the name of 'a' and the document type 'cpp'.

Figure 6:
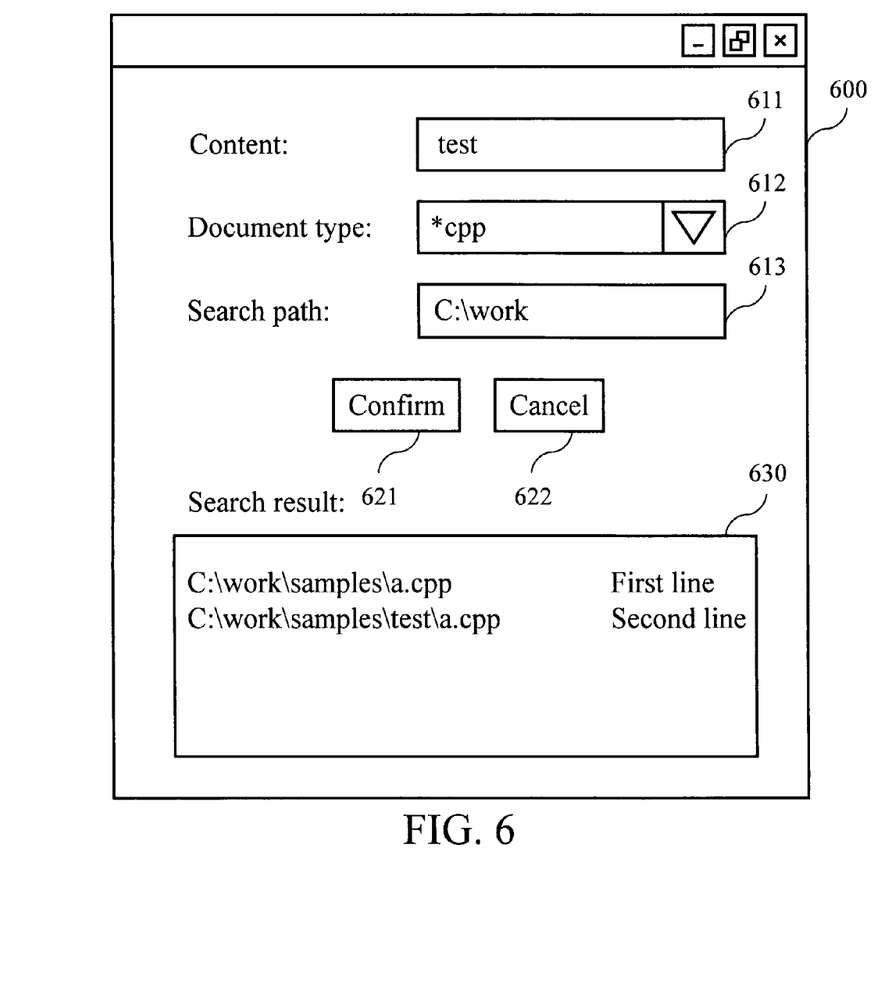
FIG. 6 is a schematic view of the search window in the second embodiment.

FIG. 6 is a schematic view of the search window according to the second embodiment of the invention. This embodiment differs from the first embodiment in that the first embodiment compares the document name, whereas the second embodiment compares the document content. Likewise, a search window 600 is provided after the search field 410 is clicked. In practice, the search window 600 includes: an input field 611, a selecting element 612, a path input field 613, a confirming element 621, a canceling element 622, and a displaying field 630. It should be noted that the second embodiment differs from the first embodiment in that its input field 611 allows the user to enter a document content. In comparison with the displaying field 530 of the first embodiment, the displaying field 630 further shows the location of text, such as line 1, line 2, etc. The other elements, such as the selecting element 612, the path input field 613, the confirming element 621, and the canceling element 622 are the same as the selecting element 512, the path input field 513, the confirming element 521, and the canceling element 522 in the first embodiment, respectively.

Figure 7:
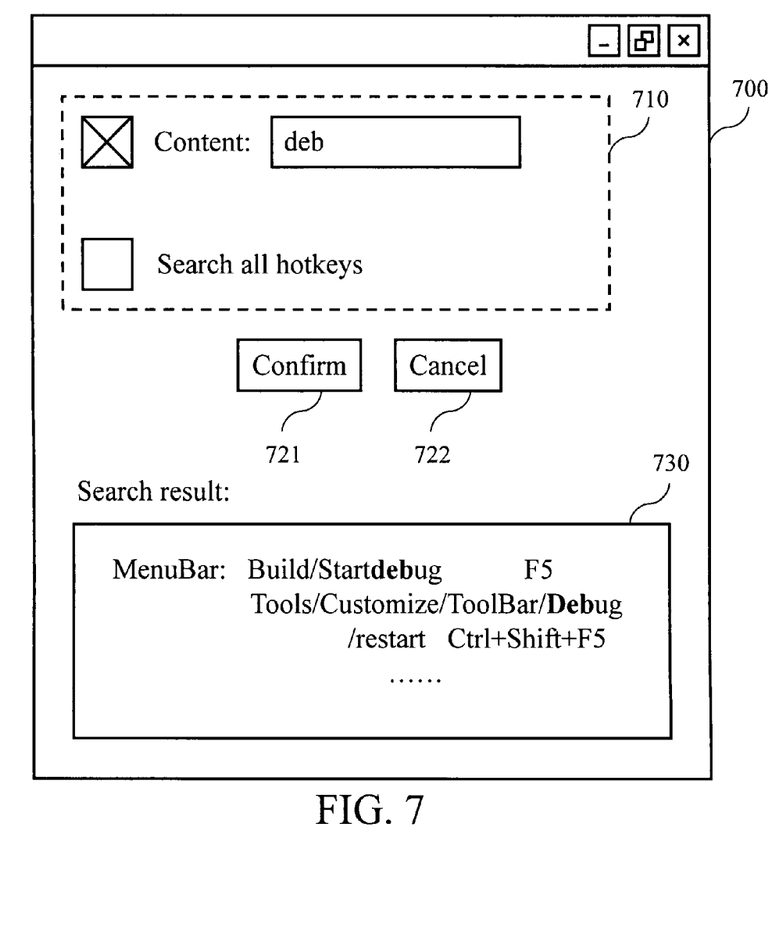
FIG. 7 is a schematic view of the search window in the third embodiment.

Please refer to FIG. 7 for a schematic view of the search window according to the third embodiment of the invention. When the user wants to search for a hotkey, he can make a corresponding lick in the search field 410 (e.g., selecting the hotkey search). A search window 700 is then provided. The search window 700 includes: a selection input field 710, a confirming element 721, a canceling element 722, and a displaying field 730. The third embodiment is similar to the first and second embodiments. The difference is in that the searching module 106 uses the search content and the search criterion received by the receiving module 105 to compare the search content with the resource file (e.g., a dll file). When there is a match, the result is shown in the displaying field 730. It should be noted that the resource file represents the file that stores menu text (including hotkeys). It usually has an auxiliary filename of 'ini', 'dll', etc. The search content and the search criterion can be entered via the selecting field 710. The user clicks the confirming element 721 to complete the entering process, or clicks the canceling element 722 to cancel the input.

Please refer to FIGS. 8A and 8B that show the search window in the fourth embodiment of the invention. Please first refer to FIG. 8A. When the user uses a browser window 800 to browse a web page, he enters the web address in the input field 811 and uses the cursor 301 to click the confirming element 812. In addition, he can also press the right key of the mouse to generate a toolbar 813. Since the updating module 103 has already completed the process of updating the default registry information in the OS, the toolbar 813 is added with the 'Search' function in addition to the original 'Function 1', 'Function 2', and 'Function 3'.

After generating the toolbar 813, the user can move the cursor 301 to 'Search' on the toolbar 813 and click it, generating a search window 850 as shown in FIG. 8B. Moreover, the user can set the search content and the search level via the search setting field 851. After the settings are completed, the user clicks the confirming element 852 to start searching. The result is shown in the displaying field 854. The user can also click the canceling element 853 to cancel this search and close the search window 850. The fourth embodiment and the third embodiment only differ in the location of the embedded search field 814. The searching module 106 uses the search content and the search criterion (e.g., the search type of web page) received by the receiving module 105 to compare the search content with the web page. It further enables the user to set the limit in the search level and extraction range. The same parts are not described here again.

In summary, the invention differs from the prior art in that it searches for the interface specification according to the application name. The interface specification is then used to update the default registry information in the OS, so that different applications can be embedded with a search field. This technique can solve problems existing in the prior art. The invention thus facilitates searches in applications.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An embedded searching method used on at least one application via registry information of an operating system that records a registry code of the at least one application, the method comprising the steps of:

storing the application name of the at least one application and its corresponding interface specification in an application database;

searching for the at least one application in the registry information according to the application name;

searching the application database and loading the interface specification for the at least one application in order to update the registry information;

generating a search field to be embedded into an application operating interface according to the application operating interface of the at least one application and the registry information when the at least one application is executing;

receiving a search content and a search criterion after the search field is clicked; and comparing the search content with at least one document, at least one web page, or at least one resource file of the at least one application according to the search criterion, and displaying a matched result immediately.

2. The embedded searching method of claim 1, wherein the search criterion includes search types of web page, document, directory, and hotkeys.

3. The embedded searching method of claim 2 further comprising the step of setting a search level to limit a search range and extraction range when the search criterion is the search type of web page.

4. The embedded searching method of claim 1 further comprising the step of generating a search window for entering the search content and the search criterion when the search field is clicked and displaying a search result in the search window.

5. The embedded searching method of claim 1, wherein the at least one resource file includes non-executable text strings.

* * * * *